United States Patent [19]

Jansen et al.

[11] 4,314,361
[45] Feb. 2, 1982

[54] DATA BUFFER MEMORY OF THE FIRST-IN, FIRST-OUT TYPE COMPRISING A FIXED INPUT AND A VARIABLE OUTPUT

[75] Inventors: Pierre G. Jansen; Jozef L. W. Kessels; Benny L. A. Waumans, all of Eindhoven, Netherlands

[73] Assignee: U.S. Philips Corporation, New York, N.Y.

[21] Appl. No.: 157,132

[22] Filed: Jun. 6, 1980

Related U.S. Application Data

[63] Continuation of Ser. No. 965,214, Nov. 30, 1978, abandoned.

[30] Foreign Application Priority Data

Dec. 12, 1977 [NL] Netherlands ................ 7713708

[51] Int. Cl.³ ............................................... G11C 19/00
[52] U.S. Cl. ........................................ 365/221; 365/78
[58] Field of Search ............... 307/221 R; 365/73, 75, 365/78, 221

[56] References Cited

U.S. PATENT DOCUMENTS

| | | | |
|---|---|---|---|
| 3,629,857 | 12/1971 | Faber | 364/200 |
| 3,736,575 | 5/1973 | Mallerich | 365/78 |
| 3,949,384 | 4/1976 | Lohmann | 365/78 |
| 4,090,256 | 5/1978 | Hepworth et al. | 365/78 |
| 4,128,879 | 12/1978 | Gardner | 365/73 |

FOREIGN PATENT DOCUMENTS 1363707 8/1974 United Kingdom.
1479774 7/1977 United Kingdom.

*Primary Examiner*—Stuart N. Hecker
*Attorney, Agent, or Firm*—Thomas A. Briody; Robert T. Mayer; James J. Cannon, Jr.

[57] ABSTRACT

A data buffer memory of the "first-in, first-out" type, having a fixed input by which data are applied to the buffer, and an output bus by which data are extracted from the buffer. The buffer includes logic means whereby a variable output location can be selected. The logic means determines by means of status signals in cooperation with signals applied from outside the buffer, where data are read from the buffer and, if necessary, when data in the buffer are to be shifted further from the input location.

9 Claims, 6 Drawing Figures

DATA BUFFER MEMORY OF THE FIRST-IN, FIRST-OUT TYPE COMPRISING A FIXED INPUT AND A VARIABLE OUTPUT

This is a continuation of application Ser. No. 965,214, filed Nov. 30, 1978, now abandoned.

BACKGROUND OF THE INVENTION

1. Field of the Invention

The invention relates to a data buffer memory of the "first-in, first-out" type, having logic means which ensure that the output for data to be read is situated substantially as near as possible to the input for data to be written, depending on the filling of the buffer, thus ensuring a substantially uninterrupted content of the buffer.

2. Description of the Prior Art

A wide variety of data buffer memories of the described "first-in, first-out" type are known; they are inter alia used as a buffer device in digital data processing and communication systems at areas where differences occur in the rate in which input data is supplied and the rate in which output data is consumed. A number of the known buffers are characterized by a simple construction, notably by a pronounced repetitive character of the various sections of the buffer. An example in this respect is formed by the buffer described in British Pat. No. 1,363,707. Buffers of this kind involve a problem in that, when the capacity of the buffer amounts to n sections, a message which is applied to an empty buffer appears on the output thereof only after n clock pulse cycles. Particularly if n is large ($>32\ldots$), inadmissible delays are liable to occur in practice. These buffers are thus characterized as having a fixed input and a fixed output.

Also known are buffers which do not involve such a delay, because counting devices are used to activate a variable input location as well as a variable output location of the buffer. In such cases it is not necessary to transport the data each time through the entire buffer for transfer from an input to an output. Particularly in the case of an empty or almost empty situation, delays are thus prevented. Buffer devices of this kind are known from British Pat. No. 1,479,774. These buffer devices, however, involve a major problem in that the complexity of control substantially increases, particularly in the case of buffers having a large number of sections. Counters having a high counting capacity and complex decoding selection networks for the inputs and outputs to be assigned or other additional steps are then required. Moreover, the linking of a number of small buffers in order to form one large buffer is not possible without giving rise to additional complications.

SUMMARY OF THE INVENTION

The invention has for its object to provide a buffer memory of the described type which has a simple set-up and which, moreover, involves a short data delay time. In order to achieve this object, the data buffer memory in accordance with the invention is characterized in that the buffer comprises an output bus by which data are read from the buffer, notably from a register thereof assigned for this purpose, the buffer having an input which is connected to the first register of the buffer and by which data to be written are introduced. The buffer thus obtained may be described as a buffer comprising a fixed input and a variable output. Because of the variable output location, being each time situated as near as possible to the input in order to ensure a substantially uninterrupted content of the buffer, a minimum delay time of the buffer is obtained. The simple set-up, accompanied by a completely repetitive character for all sections of the buffer, is characterized in a further embodiment of the buffer memory in accordance with the invention in that logic means are provided for each section of the buffer, the logic means in the buffer, comprising n registers $(0, 1, \ldots n-1)$, being capable of generating the following signals:

(a)

$$selout\,(i) = s(i) \cdot \bigwedge_{j=i+1}^{n-1} \overline{s(j)}$$

which, if this condition is satisfied, represents the signal whereby the register (i), being the first filled register, viewed from the last section of the buffer, can be selected and hence connected to the output bus;

(b) $sh = s(n-1).creq$ which, if this condition is satisfied, is the shift signal for shifting the entire content of the buffer over one section in reaction to the appearance of a request signal (creq) which originates from outside the buffer and which indicates that data are applied to the input, this request being granted if at least the last section of the buffer is empty; this is indicated by a status signal $\overline{s(n-1)} = 1$ of the latter section, register $(n-1)$. For generating a status signal the logic means are operable such that $s(i)$ is set if the condition $creq.\overline{ers}.s(i-1)$ is satisfied; the status signal indicates the filling of a register (i) as a result of a request signal (creq) whereby the register (0) is filled with data from outside the buffer or a register (i) $i \neq 0$ is filled with data in reaction to a shift signal while none of these registers has been emptied at the same time over the output bus, denoted by an acknowledge signal (ers) from outside the register, and at least the preceding register $(i-1)$, with the exception of $i = 0$, has been filled; the status signal for $s(i): = 0$ indicates that the register (i) has been emptied by the output bus and has not been filled again at the same time, at least the next register $(i+1)$ being empty (written as reset $(s(i)) = creq.ers. \overline{s(i+1)}$). Linking of a plurality of buffers can thus be performed without any complications. Another embodiment of the buffer memory is characterized in that for the formation of a status signal $s(i): = 1$ with the logic means $$\overline{creq.ers}. \bigwedge_{j=o}^{i-1} s(j)$$

has been satisfied which means that when a write request appears on the input, register (0), or the shifting in a register (i) respectively and the fact that the register $(i+1)$ is not read at the same time (ers), all registers preceding the register (i) have been filled and that the status signal $s(i): = 0$ if the condition $$\overline{creq}.ers \bigwedge_{j=i+1}^{n-1} \overline{s(j)}$$

has been satisfied; this occurs in the absence of a request for writing (creq) and when the register (i) is being emptied (ers) and subject to the condition that all subsequent registers are empty. In addition to the described properties, this buffer has a self-stabilizing character.

This means that there can be no situations in which an error, for example caused by a fault, can give rise to a permanent error situation. This is inter alia due to the fact that at no time doubt can arise as regards the location in the buffer where the register is to be connected to the output bus. The register (i), being the first filled register viewed from the last section of the buffer, is unambiguously determined.

Furthermore, in order to minimize the risk of data loss due to any error occurring (not causing instability), a preferred embodiment of the buffer memory is characterized in that the logic means for forming a status signal ($s(i) := 1$) implies that the condition $creq.\overline{ers}.s(i-1)$ is satisfied, which is the case upon appearance of a request for writing (creq) and the non-simultaneous reading ($\overline{ers}$) of the preceding filled register (i−1) (except for i=0), while for the status signal $s(i) := 0$ implies that the condition $\overline{creq}.ers$.

$$\bigwedge_{j=i+1}^{n-1} s(j)$$

is satisfied, which is the case in the absence of a request for writing ($\overline{creq}$.) and during the emptying (ers) of the register (i) and subject to the condition that all subsequent registers are empty.

As a result of the use of said status for each section, preferably being updated in bistable elements as part of the logic means, a simple arrangement is obtained which is suitable for integration purposes. Due to the modular construction, the relevant register and the associated logic means can be constructed as a solid state integrated circuit at least for each section of the data buffer memory. It is alternatively possible for the buffer to consist of at least one group of registers and at least one group of logic means for each section of the buffer, said group being solid state integrated circuits. Said modular construction also implies that a plurality of buffer memories can be readily connected one behind the other in order to realize buffer lengths as desired.

Further particulars and characteristics of the buffer memory will be described by way of example hereinafter with reference to an embodiment of a buffer memory in accordance with the invention, whereto the invention, however, is not restricted.

DESCRIPTION OF THE PREFERRED EMBODIMENT

Figure 1:
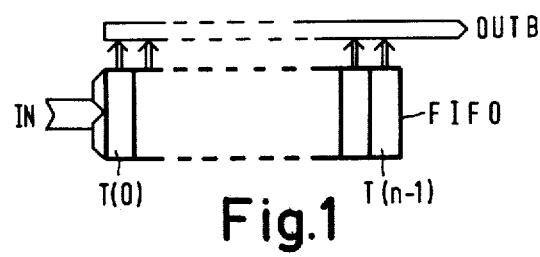
FIG. 1 shows a circuit diagram of a "first-in, first-out" buffer memory, comprising a fixed input and a variable output in accordance with the invention.

FIG. 1 shows a simplified diagram of a "first-in, first-out" buffer memory, comprising a fixed input and a variable output in accordance with the invention. The buffer is denoted by the reference FIFO. The fixed input IN is situated at the input of the first section T(0) of the buffer memory. OUTB forms the output bus by which data are extracted from the buffer, notably from outputs of an assigned register section T(0), T(1), . . . T(n−1) thereof.

Figure 2:
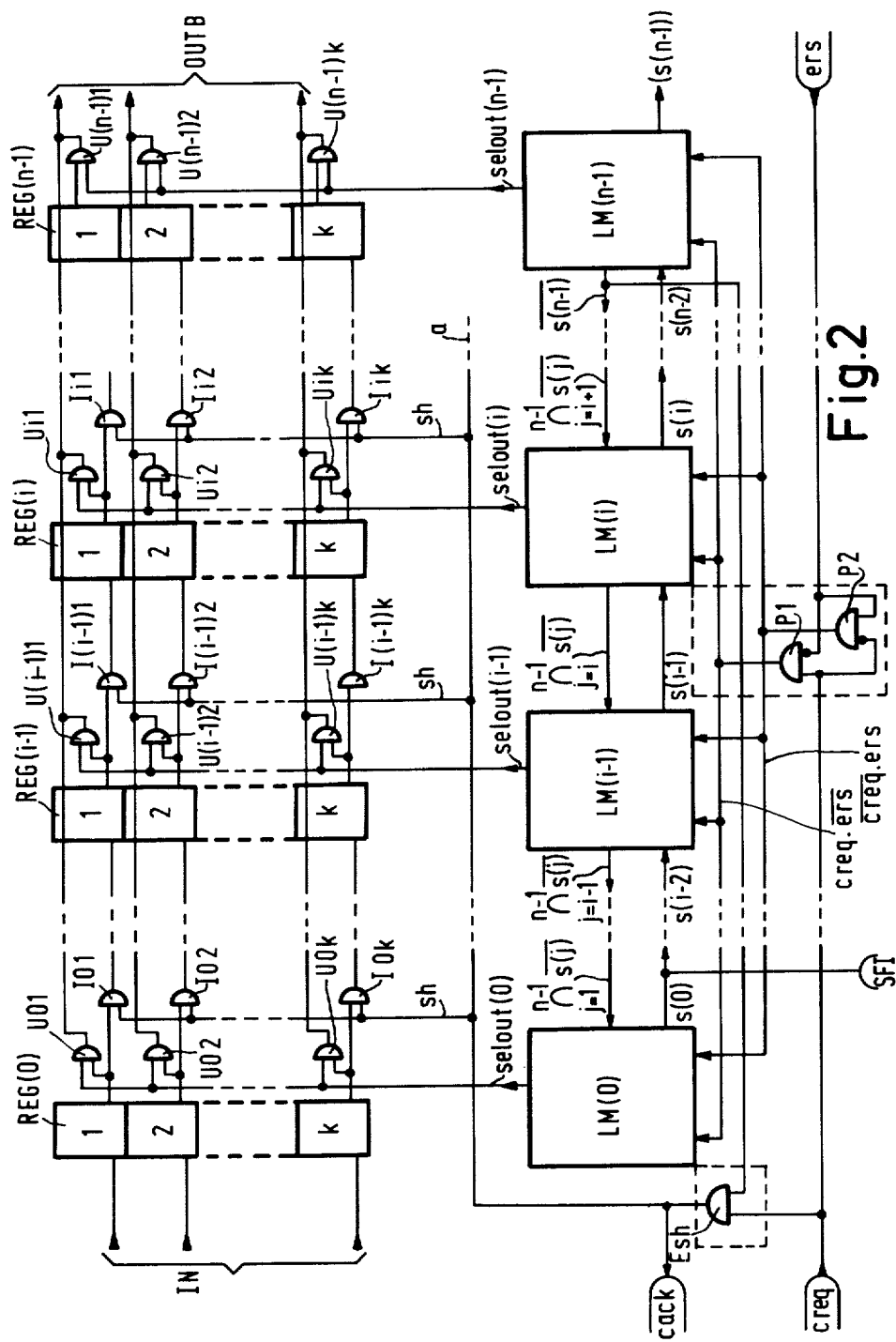
FIG. 2 shows a more detailed block diagram of the buffer memory in accordance with the invention.

FIG. 2 shows a more detailed block diagram as an example of the construction of the buffer of FIG. 1, notably in a modular arrangement. The buffer consists of a register section comprising the registers REG(0), . . . REG(i−1), . . . REG(n−1). These registers serve for the storage of applied data. Each register may consist of one or more stages 1, 2, . . . k. It is thus indicated that the data path can be chosen at random as far as the width is concerned. For each bit of width of the data path, a stage 1, 2, . . . k per REG(i) is required. The register REG(0) of the first section of the buffer memory serves as the input register for the entire buffer. The inputs IN(an input terminal for each bit of the data path) are connected to REG(0). The output bus OUTB is shown to extend across the registers in FIG. 2. Each register REG(i) has its outputs (of each stage 1, 2, . . . k) connected to the bus OUTB. For this purpose, use is made of AND-function gates: U01, U02, . . . U0k for the relevant register stages 1, 2, . . . k of REG(0); Ui1, Ui2, . . . Uik for the relevant register stages 1, 2, . . . k of REG(i) etc. The selection as regards which of the registers REG(i) is connected to the output bus OUTB is determined by the logic means LM(0), . . . LM(i−1), LM(i), . . . LM(n−1) which are provided for each section of the buffer. A signal selout (0), . . . selout (i), . . . or selout (n−1) is generated in said logic means and is applied to said AND-function gates U01, . . . U0k, . . . or Ui1, . . . Uik, . . . or U(n−1)1, . . . U(n−1)k. Thus, the selection is effected of the one register REG(i), where i=0, . . . (n−1), wherefrom data are applied to the output bus OUTB of the buffer.

For the shifting of the data between the sections inside the buffer, occurring when new data are applied to the buffer and space is still available in the buffer, connections are provided between the stages of the various registers, said connections extending, through AND-function gates I01, I02, . . . I0k, . . . and Ii1, Ii2, . . . Iik, respectively, between an output of a given register stage and an input of a register stage of the next section of the buffer. In the embodiment shown in FIG. 2, the outputs for each register stage are shown in common, i.e. for the output to the output bus OUTB as well as the output to the input of a register stage of the next section of the buffer. This shifting takes place under the control of the shift signals, "sh" which are generated in the logic means LM(i).

The buffer memory furthermore consists of a control section comprising the logic means LM(i) for each section of the buffer. The signals generated in these logic means are, in addition to the signal selout (i), the status signal s(i) and $\overline{s(i)}$ which form an indication "full" and "empty", respectively, of a register (i), and also a preferably used combinatory form thereof:

$$\bigwedge_{j=i+1}^{n-1} \overline{s(j)};$$

this means that on the basis of the Boolean AND-function of all registers REG(i+1) upto and including REG(n−1), the status signal s(j) has a value zero (which means $\overline{s(j)} = 1$). This is the definition of the condition that all registers succeeding REG(i) are empty. The indication "empty" means that no valid data are present therein. Further particulars in this respect will be given with reference to FIG. 5. In the control section, an AND-function gate P1 monitors a condition $creq.\overline{ers}$ in this example. This means that each time when this condition is satisfied, a signal having the logic value "1" appears on the output of P1. This signal is applied to all logic means LM(i) (line denoted by creq.$\overline{ers}$). The signal "creq" represents a request from outside the buffer for transferring data to the buffer. The signal "ers" represents an acknowledge signal from outside the buffer which occurs (logic 1-value) when data have been taken over from the buffer. Similarly, in this example the inverse condition $\overline{creq}$-ers is monitored in an AND-function gate P2. This condition is satisfied if the request signal "creq" does not appear simultaneously with the acknowledge signal "ers". This signal "creq" is also applied to all logic means ... LM(i) ... In an AND-function gate Esh, the said signal "sh" is generated. Each time when the request signal "creq" appears and the buffer has not been completely filled yet, denoted by the status $\overline{s(n-1)}=1$, the gate Esh supplies the shift signal "sh" which is applied to each register of all sections of the buffer, except for the last register. This can be expressed in a formula as follows: $sh = creq.\overline{s(n-1)}$. When this expression is satisfied, the shift operation will take place in reaction to a clock signal (not shown), which means that the clock signal is subject to the condition that "sh" occurs. This signal "sh" can also be used, if desired, as the acknowledge signal "cack" in order to indicate that the request "creq" has been reacted to, which means that the data applied to the input IN have indeed been stored in the first section (REG(0)). The complete data content of the buffer are thus shifted over one section as one block. The gate Esh is assumed to be included in the logic means LM(0). Similarly, the gates P1 and P2 are assumed to be included in arbitrary logic means LM(i). Finally, FIG. 2 shows a line which is denoted by the reference SFI and which extends outside the buffer. SFI = s(0), which means that SFI has a logic 1-value as long as s(0) = 1, i.e. an long as REG(0) contains data. This is an indication that the buffer still contains data, so that data are present on the lines OUTB.

Figure 3:
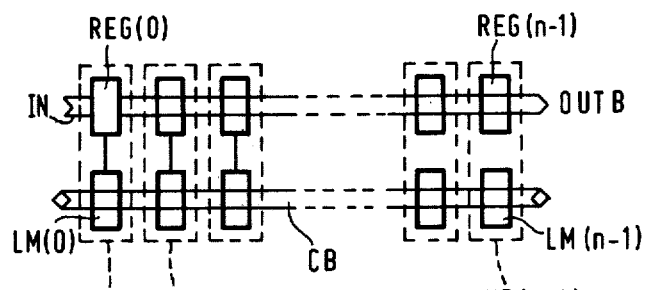
FIGS. 3 and 4 show examples of the partitioning of the buffer memory in view of construction in the form of solid state integrated circuits.
Figure 4:
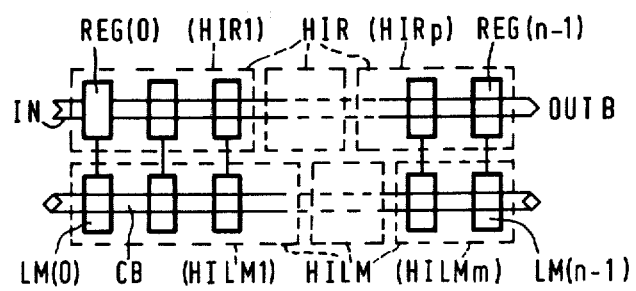

FIGS. 3 and 4 shows a number of possibilities for partitioning the buffer memory in view of construction in the form of solid state integrated circuits. The modularity of the buffer memory shown in FIG. 2 enables a variety of solutions: the references VI0, VI1, ... VI(n−1) in FIG. 3 indicate that integration is possible at least for each section of the buffer: a REG(0) is combined in an IC with logic means LM(0). The connection between all sections VIi is formed in the register section (upper part of the drawing of FIG. 3) by the output bus OUTB, and so are the connections within the bus OUTB in the drawing between the stages of the successive buffer sections for the shifting of the data from one section to a next section. The connections between the logic means and the further input and output signals are denoted in FIG. 3 by a signal line bundle CB. Similarly, it is indicated in FIG. 4 that integration is integrated circuits is possible for each group HIR or groups HIR1, ... HIRp of registers REG(0), ... REG(n−1) or for each group HILM or groups HILM1, ... HTLMm of logic means LM(0) ... LM(n−1).

Obviously, the construction of complete buffer memories in one solid state integrated circuit is also possible. The linking of the sections or complete buffer memories does not impose problems, as will yet be described with reference to FIG. 5.

Figure 5:
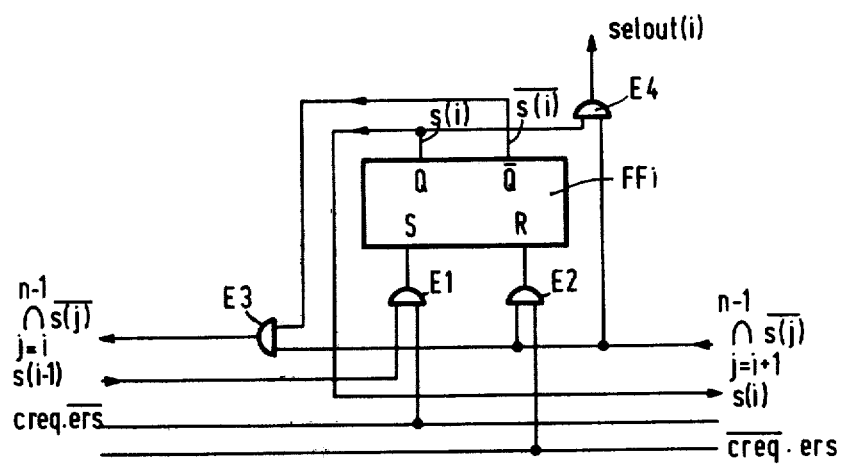
FIG. 5 shows an example of the logic means of a section of the buffer memory.

FIG. 5 shows an embodiment of the logic means LM(i) of a buffer section (i) for controlling the register REG(i) of this section. The logic means in this embodiment comprise a flipflop FFi, having a set input S and reset input R and outputs Q and $\overline{Q}$. Also shown are four logic AND-function gates E1, E2, E3 and E4. The construction of the logic means is simple and offers proper operation of the buffer memory when the memory elements (flipflops) used, like the memory cells of the registers, are capable of reading themselves; to this end, use can be made of, for example, edge-triggered D-types. These elements are commercially available (for example, type indication 74LS74). In other embodiments other logic elements such as NAND-gates etc. can alternatively be used within the scope of the invention. For the memory elements use can notably be made also of flipflops of the master-slave type. The essential aspect is that the logic functions to be performed by the logic means can indeed be realised. When use is made of master-slave flipflops, at least two clock pulse signals will have to be used instead of one clock pulse signal. In order to give an idea of the implications thereof, reference is made to copending application Ser. No. 963,547 filed on Nov. 24, 1978 by the applicants herein and owned by the same assignee.

The functions realised in the logic means are such that the desired signals for the control of the buffer are generated. These signals are:

(a) selout (i), which is the signal which provides the selection of the register REG(i) wherefrom data are read to the output bus OUTB. This signal selout(i) = 1 appears if the condition $$s(i), \bigwedge_{j=i+1}^{n-1} \overline{s(j)}$$

is "true" (which means that it has the logic value "1"). In the AND-function gate E4, it is determined whether this condition is satisfied. The status s(i) of the relevant section is then considered: the section must be filled, so s(i) = 1. Furthermore, all further sections of the buffer must be empty. This is determined by the expression $$\bigwedge_{j=i+1}^{n-1} s(j).$$

This takes place in the preceding section logic means LM(i+1) or LM(i) for LM(i−1). This is realised in the AND-function gate E3: therein it is determined whether $$\bigwedge_{j=i}^{n-1} \overline{s(j)} = 1,$$

i.e. whether the condition is satisfied that the register KEG(i) and all subsequent registers (which explains the symbol ⌒ as the Boolean AND-function symbol) are empty (status s(i) = 0).

(b) $sh = \overline{s(n-1)}.creq$. which is the shift signal which is formed in the gate Esh already described with reference to FIG. 2. This gate Esh and also the gates P1 and P2 mentioned with reference to FIG. 2 may be accommodated in one of the logic means. This is indicated in FIG. 2 by the inclusion of P1 and P2 in LMi and Esh in LM(0) (see broken lines). In the case of construction in the form of integrated circuits, said gates may occur a number of times (in order to maintain repetitiveness), and are then connected to signals creq and ers only in as far as is necessary for obtaining the desired signals "sh", creq.$\overline{ers}$ and $\overline{creq}$.ers. See also the description given with reference to FIG. 6, indicating how the gates P1 and P2 may be included in the gates E1 and E2 per LM(i).

(c) status signals s(i) and s(j)). In order to set and reset the status by the inputs S and R of FFi, a number of possibilities exist: the first possibility is: set(i)=creq.$\overline{ers}$.-s(i−1), with for the resetting: reset(i)=$\overline{creq}$.ers s(i±1). These conditions can be simply monitored by means of logic AND-function gates for each logic means per section. A drawback of this choice, however, consists in that the buffer is not self-stabilizing. An incorrect, status s(i), for example, caused by a fault, may give rise to a permanent fault situation.

A second possibility is:

$$set(i) = \overline{creq.ers} \bigwedge_{j=0}^{i-1} \overline{s(j)}.$$

and for $$reset(i) = \overline{creq.ers} \bigwedge_{j=i+1}^{n-1} \overline{s(j)}.$$

These conditions can again be simply monitored by means of AND-function gates for each logic means. For the function $\bigwedge$, see above sub (a). This choice ensures stability in the buffer: an error in a status s(i) does not give rise to a permanent error situation. The error disappears in the course of time. However, generally a data loss will occur.

A third possibility, where the data loss is minimized, is the preferred solution, consisting of set(i)=creq.ers.-s(i−1), where $$reset(i) = \overline{creq.ers} \bigwedge_{j=i+1}^{n-1} \overline{s(j)}.$$

The realization thereof can again be simply realized by the logic means. This is shown in FIG. 5 by way of the AND-function gates E1 and E2. The gate E1 monitors the condition creq.$\overline{ers}$.s(i−1) and the gate E2 monitors the condition $$\overline{creq.ers.} \bigwedge_{j=i+1}^{n-1} \overline{s(j)}$$

whereby the input S of FFi is activated if these conditions are satisfied. In the former case, s(i):=1, while in the latter case s(i):=1.

Figure 6:
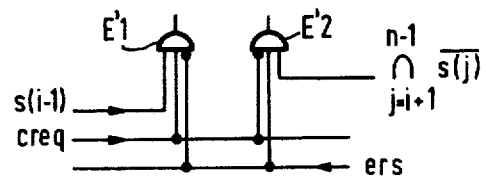
FIG. 6 shows a detail of FIG. 2, together with a detail of FIG. 5, in a slightly different embodiment.

It is to be noted that the gates P1 and P2 shown in FIG. 2 can also be assumed to be included in each of the logic means LM(i), signal lines "ers" and "creq" extending along all logic means for each section instead of creq.$\overline{ers}$ and $\overline{creq}$.ers, see FIG. 6. For proper operation, the condition for set(i) can then be monitored in the gate E'1 by way of "creq" and the inverted "ers" and the status s(i−1). Similarly, the condition for reset (i) can then be monitored in the gate E2 by way of the inverted "creq" and "ers" and the condition $$\bigwedge_{j=i+1}^{n-1} \overline{s(j)}.$$

The arrangement of FIG. 5 is universal for all logic means LM(0), ... LM(n−1). For LM(0) the input status s(i−1) will not be present; however, this input will require a permanent logic value "1". Similarly, LM(n−1) for the input with $$\bigwedge_{j=i+1}^{n-1} \overline{s(j)}$$

will have the permanent value "1". In the case of extension of the buffer, these inputs can be included in the normal signals paths again as desired in order to enable coupling in a preceding or subsequent buffer. Thus, an extremely simple extension method is realized.

As regards the simple possibility of extending the buffer, it is also to be noted that this extension, notably when solid state integrated buffers are concerned, does not necessarily mean that all signal lines (to a next or preceding buffer) must be extended. It is sufficient to interconnect a "creq" signal input from a next buffer to an SFI signal output of a preceding buffer, and to connect a signal input "ers" of a preceding buffer to a "cack" signal output of a subsequent buffer. The OUTB, obviously, is connected to the IN lines of successive buffers. It is to be noted that in this case the delay time is increased: for lock connected additional buffer, the delay time increases by one unit (the minimum delay time through a buffer is taken as one unit). According to this solution, however, a buffer IC does not require an excessive number of input and output terminals.

What is claimed is:

1. A data buffer memory of the "first-in, first-out" type, comprising:
   a plurality of registers sequentially arranged in sectons, each section having a plurality of stages;
   input means connected to the first of said registers of said buffer through which register data to be written are introduced;
   an output bus selectively coupled to all of said registers through which bus data are read from said buffer memory,
   logic means associated with each of said registers to ensure that data written into the buffer memory are advanced register by register from the first of said registers in response to a request to write in data and a spare register being available;
   each of said logic means in use producing a status signal indicative of whether or not its associated register is full; and
   said logic means including means for receiving a status signal from an adjacent logic means and for producing from the status signals a control signal to enable the full register from the input register to be read out.

2. A data buffer memory as claimed in claim 1, wherein said logic means are provided for each section of said buffer;
   said logic means having n registers capable of generating the following signals:

(a) $$\text{selout}(i) = s(i) \cdot \overline{\prod_{j=i+1}^{n-1} s(j)}$$

which, if this condition is satisfied, represents the signal whereby register (i), being the first filled register, viewed from the last section of the buffer, can be selected and hence connected to the output bus;

(b) $sh = \overline{s(n-1)} \cdot creq$ which, if this condition is satisfied, is the shift signal for shifting the entire content of the buffer over one section in reaction to the appearance of a request signal (creq) which originates from outside the buffer and which indicates that data are applied to the input, this request being granted if at least the last section of the buffer is empty, indicated by a status signal $\overline{S(n-1)} = 1$ of the said last section, register $(n-1)$.

3. A data buffer memory as claimed in claim 2, wherein said logic means includes means to generate a status signal $s(i): = 1$ when means creq.ers has been satisfied, when a write request appears on the input, (register (0)), or register (i) is shifted and register (i+1) is not read at the same time (ers), all registers preceding the register (i) have been filled and means to generate a status signal $s(i): = 0$ is formed if the condition $$\overline{creq/er} \; \overline{\prod_{j=i+1}^{n-1} s(j)}$$

has been satisfied, in the absence of a request for writing (creq) and when register (i) is being emptied (ers) and subject to the condition that all subsequent registers are empty.

4. A data buffer memory as claimed in claim 2, wherein said logic means includes means to generate a status signal $(s(i): = 1)$ when the condition creq.$\overline{ers}$.s(i−1) is satisfied, upon appearance of a request for writing (creq) and the non-simultaneous reading $\overline{(ers)}$ of the preceding filled register (i−1) (except for i=0), and means to generate a status signal $s(i): = 0$ when the condition $$\overline{creq.} \; ers \; \overline{\prod_{j=i+1}^{n-1} s(j)}$$

is satisfied, in the absence of a request for writing (creq) and during the emptying (ers) of the register (i) and subject to the condition that all subsequent registers are empty.

5. A data buffer memory as claimed in claim 2 wherein said logic means is capable of generating a signal to set s(i) which, if the condition creq.ers.s(i−1) is satisfied, is the status signal indicating the filling of a register (i) as a result of a request signal (creq) whereby register (0) is filled with data from outside said buffer or a register (i) i≠0 is filled with data in reaction to a shift signal, while none of these registers has been emptied at the same time by the output bus, denoted by an acknowledge signal (ers) from outside the register, and at least the preceding register (i−1), with the exception of i=0, has been filled; the status signal for $s(i): = 0$ indicating that the register (i) has been emptied by the output bus and has not been filled again at the same time, at least the next register (i+1) being empty (written as reset (s(i)) = $\overline{creq}.ers.s(i+1)$).

6. A data buffer memory as claimed in claim 5 constructed as a solid state integrated circuit.

7. A data buffer memory as claimed in claim 5, wherein said logic means includes means to generate a status signal SFI = s(0) on an output of the buffer to indicate that data are present in at least one of the registers of the buffer.

8. A data buffer memory as claimed in claim 7, wherein a register and its associated logic means form a solid state integrated circuit at least for each section of the buffer.

9. A data buffer memory as claimed in claim 7, wherein the buffer consists of at least one group of registers and at least one group of logic means, said groups being solid state integrated circuits.

* * * * *